(12) United States Patent
Kim (10) Patent No.: US 10,753,714 B2
(45) Date of Patent: Aug. 25, 2020

(54) NON-MOTORIZED TYPE FLYING UNIT FOR OBSERVATION

(71) Applicant: KOREA AEROSPACE RESEARCH INSTITUTE, Daejeon (KR)

(72) Inventor: Seung Bum Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 348 days.

(21) Appl. No.: 15/793,342

(22) Filed: Oct. 25, 2017

(65) Prior Publication Data

US 2018/0111682 A1    Apr. 26, 2018

(30) Foreign Application Priority Data

Oct. 26, 2016  (KR) .......................... 10-2016-0140243

(51) Int. Cl.
| | |
|---|---|
| F42B 10/16 | (2006.01) |
| B64C 39/02 | (2006.01) |
| B64D 19/02 | (2006.01) |
| F42B 10/14 | (2006.01) |
| F42B 10/58 | (2006.01) |
| F42B 30/00 | (2006.01) |

(52) U.S. Cl.
CPC ............. F42B 10/16 (2013.01); B64C 39/02 (2013.01); B64D 19/02 (2013.01); *B64C 2201/08* (2013.01); *B64C 2201/123* (2013.01); *B64C 2201/127* (2013.01); *F42B 10/14* (2013.01); *F42B 10/58* (2013.01); *F42B 30/006* (2013.01)

(58) Field of Classification Search
CPC ............. B64D 19/02; B64C 2201/08; B64C 2201/123; B64C 2201/185; B64C 39/02; F42B 10/58; F42B 10/14; F42B 10/16; F42B 30/006
See application file for complete search history.

(56) References Cited

U.S. PATENT DOCUMENTS

| | | | | |
|---|---|---|---|---|
| 2,044,819 A | * | 6/1936 | Taylor | F42B 10/58 |
| | | | | 102/388 |
| 2,300,233 A | * | 10/1942 | Martin | B64C 11/06 |
| | | | | 416/157 R |

(Continued)

FOREIGN PATENT DOCUMENTS

| | | | | |
|---|---|---|---|---|
| DE | 102006019757 A1 | * | 11/2007 | ............. F42B 10/58 |
| DE | 102006019758 A1 | * | 11/2007 | ............. F42B 10/50 |

(Continued)

*Primary Examiner* — Benjamin P Lee
(74) *Attorney, Agent, or Firm* — Rabin & Berdo, P.C.

(57) ABSTRACT

Provided is a non-motorized flying unit. The non-motorized flying unit includes a body part having a head part and a tail part having an accommodation space and a through hole, an image capturing unit installed in the through hole and configured to obtain an image information, a protective window installed in the through hole, a plurality of shock absorbing devices installed at the end portion of the tail part, a weight installed at the end portion of the tail part, and a lighting device installed at an end portion of the plurality of shock absorbing devices. A propulsion unit which is detachably coupled to the tail part storing a propellant which, upon combustion, forms pressure in the propulsion unit to provide thrust to the body part.

4 Claims, 6 Drawing Sheets

(56) References Cited

U.S. PATENT DOCUMENTS

| | | | | |
|---|---|---|---|---|
| 2,324,146 A * | 7/1943 | Frazer | F42B 10/58 | 244/138 A |
| 2,440,293 A * | 4/1948 | Stanley | F42B 10/58 | 244/138 A |
| 2,440,295 A * | 4/1948 | Synnestvedt | F42B 10/58 | 244/138 A |
| 2,450,992 A * | 10/1948 | Sanderson | B64D 19/02 | 244/138 A |
| 3,115,831 A * | 12/1963 | Suter | F42B 10/58 | 102/388 |
| 3,181,824 A * | 5/1965 | Anania | B64D 19/02 | 244/138 A |
| 3,291,418 A * | 12/1966 | Brunk | F42B 10/58 | 244/3.23 |
| 3,978,790 A * | 9/1976 | Sandelius | B63B 22/003 | 102/388 |
| 4,890,554 A * | 1/1990 | Schleimann-Jensen | F42B 10/58 | 102/384 |
| 4,966,078 A * | 10/1990 | Schleimann-Jensen | F42B 10/58 | 102/384 |
| 5,413,514 A * | 5/1995 | Milligan | A63H 27/007 | 244/138 A |
| 5,947,419 A * | 9/1999 | Warren | B64D 19/02 | 102/384 |
| 8,686,325 B2 * | 4/2014 | Rastegar | F41G 7/30 | 102/473 |
| 8,939,056 B1 * | 1/2015 | Neal, III | F42B 15/22 | 89/1.51 |
| 9,033,281 B1 * | 5/2015 | Adams | B64D 9/00 | 244/190 |
| 9,234,973 B2 * | 1/2016 | Scarlatti | G01V 1/16 | |
| 9,448,040 B2 * | 9/2016 | Rastegar | G06T 7/73 | |
| 9,527,596 B1 * | 12/2016 | Adams | B64C 39/024 | |
| 9,703,295 B1 * | 7/2017 | Neal, III | F42B 15/22 | |
| 9,716,862 B1 * | 7/2017 | Evans | B64C 39/024 | |
| 9,738,383 B2 * | 8/2017 | Adams | B64C 39/024 | |
| 2004/0196367 A1 * | 10/2004 | Raymond | H04N 7/183 | 348/144 |
| 2009/0218439 A1 * | 9/2009 | Carlson | F42B 12/365 | 244/17.11 |
| 2011/0315817 A1 * | 12/2011 | Miralles | B64C 39/024 | 244/63 |
| 2017/0057635 A1 * | 3/2017 | Strayer | B64C 39/024 | |
| 2018/0101169 A1 * | 4/2018 | Applewhite | B64C 11/28 | |
| 2019/0031342 A1 * | 1/2019 | Mitchell | G01S 17/89 | |
| 2019/0107374 A1 * | 4/2019 | Hill | G05D 1/12 | |

FOREIGN PATENT DOCUMENTS

| | | | | |
|---|---|---|---|---|
| GB | 583222 A * | 12/1946 | | F42B 10/58 |
| JP | 2008-500507 A | 1/2008 | | |
| KR | 10-2015-0041475 A | 4/2015 | | |
| KR | 10-1536095 B1 | 7/2015 | | |
| KR | 10-1536095 B1 | 7/2015 | | |
| WO | WO 2015/163810 A1 | 10/2015 | | |

* cited by examiner

NON-MOTORIZED TYPE FLYING UNIT FOR OBSERVATION

CROSS-REFERENCE TO RELATED APPLICATIONS

This application claims the priority of Korean Patent Application No. 10-2016-0140243 filed on Oct. 26, 2016, in the Korean Intellectual Property Office, the disclosure of which is incorporated herein by reference.

BACKGROUND

Field

The present disclosure relates to a non-motorized flying unit for observation which ascends to a high altitude in an emergency situation related to disaster or public safety in order to quickly ascertain a situation on the ground.

Description of the Related Art

In general, it is important to quickly ascertain, at a high altitude, a peripheral situation in an emergency situation related to fire, disaster, and public safety for the purpose of rescue of human lives or the like.

In the related art, a manned/unmanned aerial vehicle is used to ascertain, at a high altitude, a peripheral situation in an emergency situation.

However, the method of observing the peripheral situation by using the manned/unmanned aerial vehicle causes problems in that an operation of coping with the emergency situation is delayed because an amount of time is required to prepare the operation of the manned/unmanned aerial vehicle or it is impossible to observe the peripheral situation due to restriction to a peripheral environment, which precludes the manned/unmanned aerial vehicle from flying.

In addition, the method of observing the peripheral situation by using the manned/unmanned aerial vehicle causes problems in that this method requires high costs and a position of the manned/unmanned aerial vehicle is exposed due to noise generated by power-driven devices of the manned/unmanned aerial vehicle when performing a task that requires security.

DOCUMENT OF RELATED ART

Patent Document (Patent Document 1) Korean Patent No. 10-1536095

SUMMARY

An object of the present disclosure is to provide a non-motorized flying unit for observation which is mounted on a portable launcher and then launched into the air in an emergency situation related to fire, disaster, and public safety for the purpose of rescue of human lives or the like, thereby quickly ascertaining, at a high altitude, a peripheral situation by obtaining image information in respect to the situation on the ground while automatically generating rotational force and slowly falling without using a separate power-driven device or without being controlled.

A non-motorized flying unit for observation according to an exemplary embodiment of the present disclosure includes: a body part which is mounted on a launcher, launched in a direction toward a preset target when the launcher operates, and falls, by its own weight, toward the ground from a position of a top dead point (TDP); a propeller unit which is coupled to the body part, and automatically generates rotational force by means of drag force applied to the body part when the body part falls so as to decrease a falling velocity of the body part; and an image capturing unit which is installed on the body part, and obtains image information in respect to the ground when the body part falls.

The body part may include: a head part to which the propeller unit is coupled and which is formed to have a streamlined structure and directed toward the preset target when the head part is mounted on the launcher; and a tail part which has therein an accommodation space in which the image capturing unit is installed, and has a through hole that is formed at an end portion of the tail part and communicates with the accommodation space, the tail part being formed to be relatively heavier than the head part so that the tail part is directed toward the ground when the body part falls.

The propeller unit may include: a rotating portion which is rotatably coupled to the body part; and a plurality of blades which is installed at an equal interval around the rotating portion, comes into close contact with an outer surface of the body part when the body part ascends, and is spread outward from the body part by drag force applied to the body part when the body part falls, such that the plurality of blades is rotated together with the rotating portion.

A bearing, which is installed between the body part and the rotating portion and supports the propeller unit so that the propeller unit is rotatable, may be provided in the rotating portion so that rotational force is applied only to the propeller unit in a state in which the body part is fixed when the body part falls.

The image capturing unit may include: a camera unit which obtains the image information; a communication unit which transmits the image information obtained by the camera unit to the outside; a GPS receiving unit which transmits information about a current position of the body part to the outside; a power source unit which supplies electric power to the camera unit, the communication unit, and the GPS receiving unit; and a control unit which controls the camera unit, the communication unit, the GPS receiving unit, and the power source unit.

The non-motorized flying unit may further include a propulsion unit which is coupled to the body part, and stores therein a propellant, such that the propellant is combusted when the launcher operates and pressure is formed in the propulsion unit to provide thrust to the body part.

According to the present disclosure, like a bullet, a small-sized rocket, or the like, the non-motorized flying unit for observation is mounted on the launcher and then launched to a high altitude in an emergency situation related to disaster, public safety, and the like, and the non-motorized flying unit may obtain image information in respect to the situation on the ground while automatically generating rotational force by using drag force and slowly falling to the ground surface, such that the non-motorized flying unit is simply used and separate manipulation is not required to fly the non-motorized flying unit, and as a result, it is possible to quickly observe a periphery of a location where the emergency situation occurs without requiring time for preparing the operation of the non-motorized flying unit.

In addition, the non-motorized flying unit for observation has a simple structure and requires no separate power-driven device, and as a result, the non-motorized flying unit may be maintained/managed at a low cost in comparison with a manned/unmanned aerial vehicle, and a probability of exposing the position of the non-motorized flying unit is minimized even when performing a task that requires security, and as a result, it is possible to safely perform the task.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, exemplary embodiments of the present disclosure will be described in detail with reference to the accompanying drawings.

Figure 1:
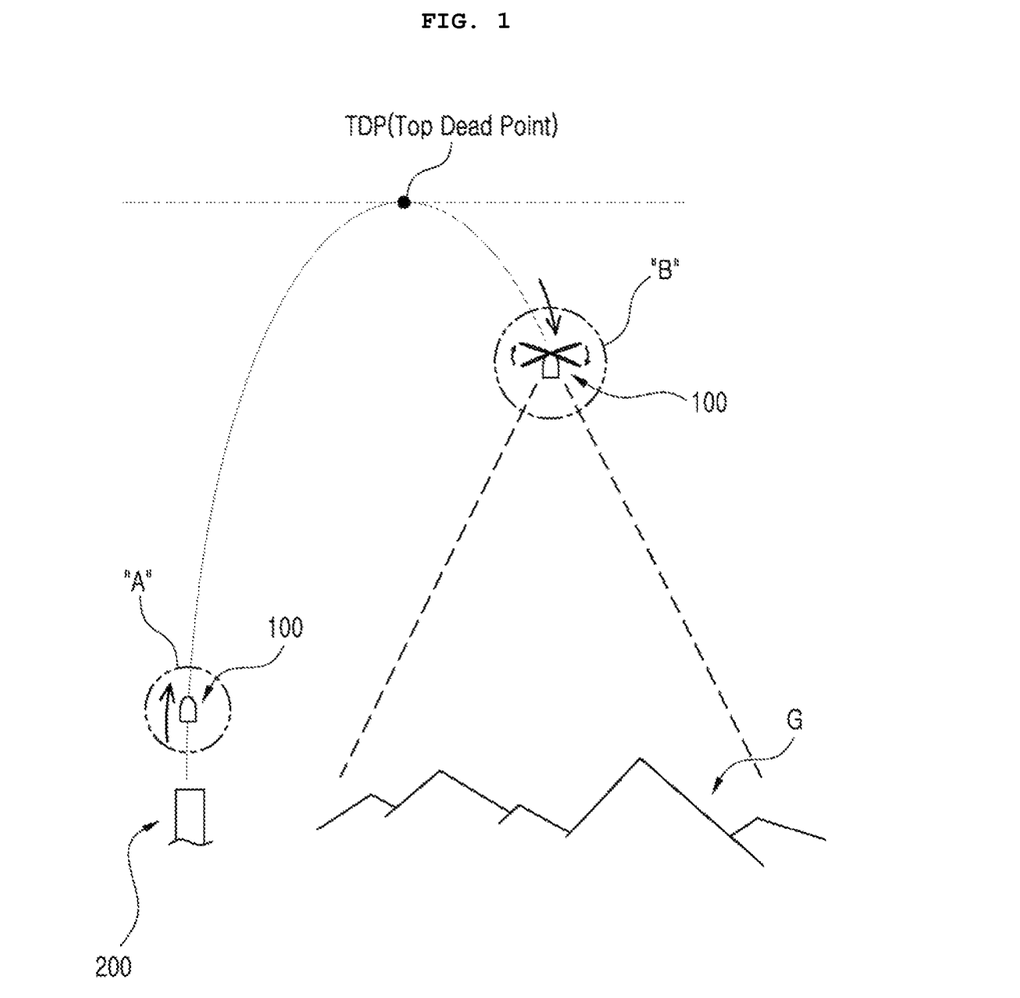
FIG. 1 is a view schematically illustrating a process of operating a non-motorized flying unit for observation according to an exemplary embodiment of the present disclosure.
Figure 2:
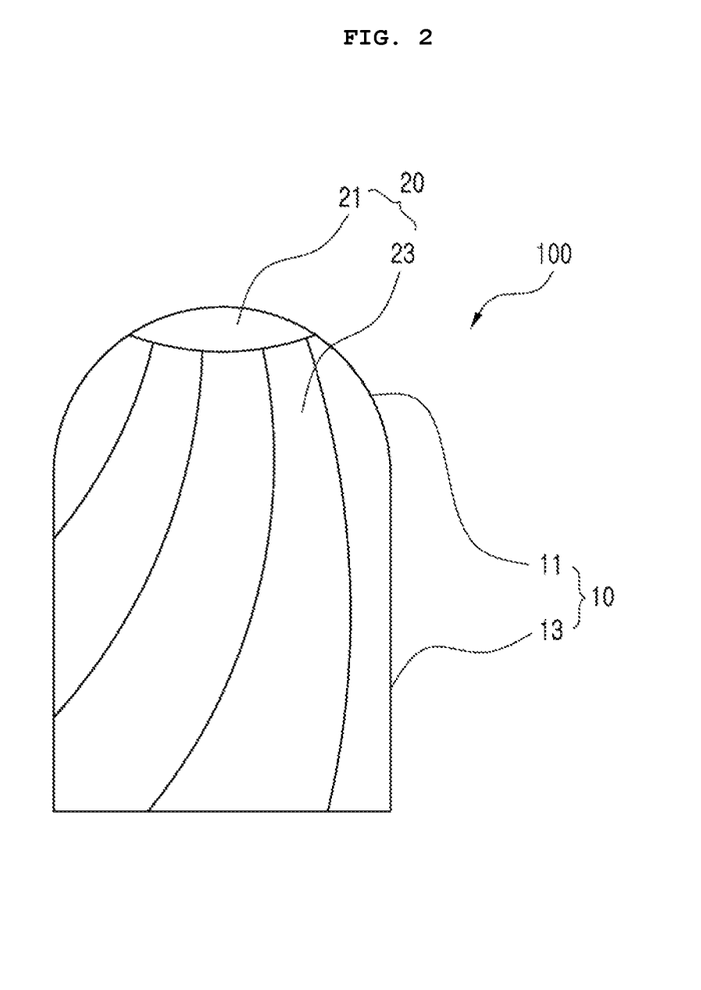
FIG. 2 is a view illustrating part "A" in FIG. 1.
Figure 3:
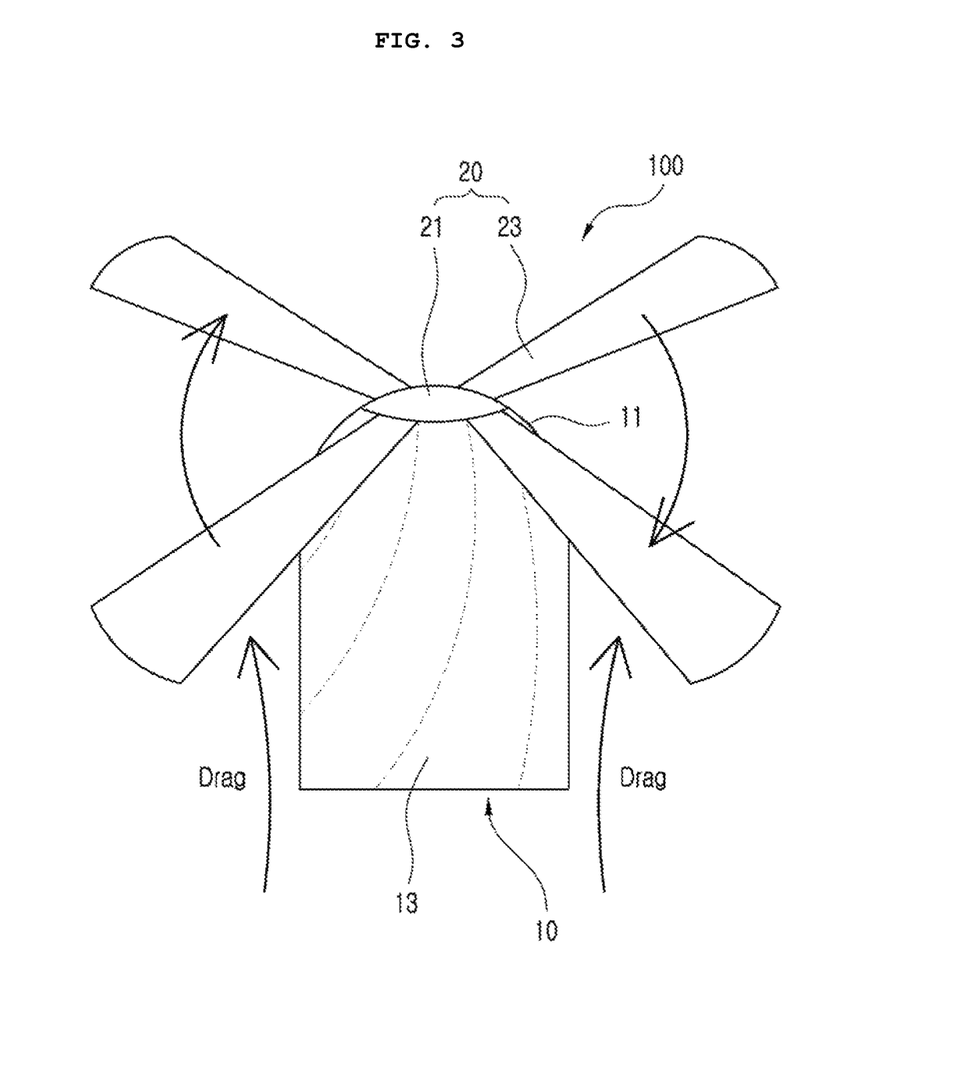
FIG. 3 is a view illustrating part "B" in FIG. 1.
Figure 5:
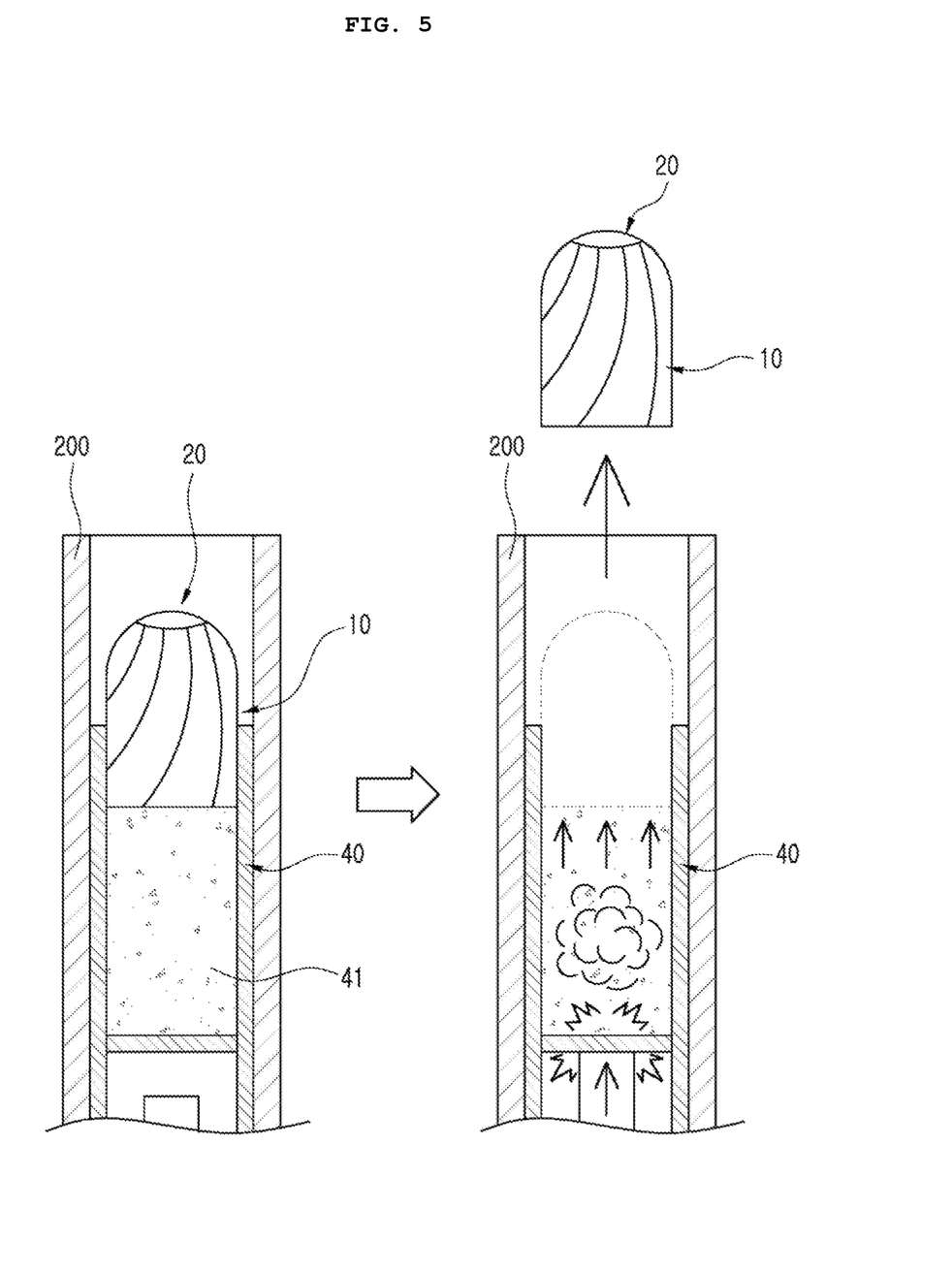
FIG. 5 is a cross-sectional view schematically illustrating a process of launching the non-motorized flying unit for observation according to the exemplary embodiment of the present disclosure from a launcher.
Figure 6:
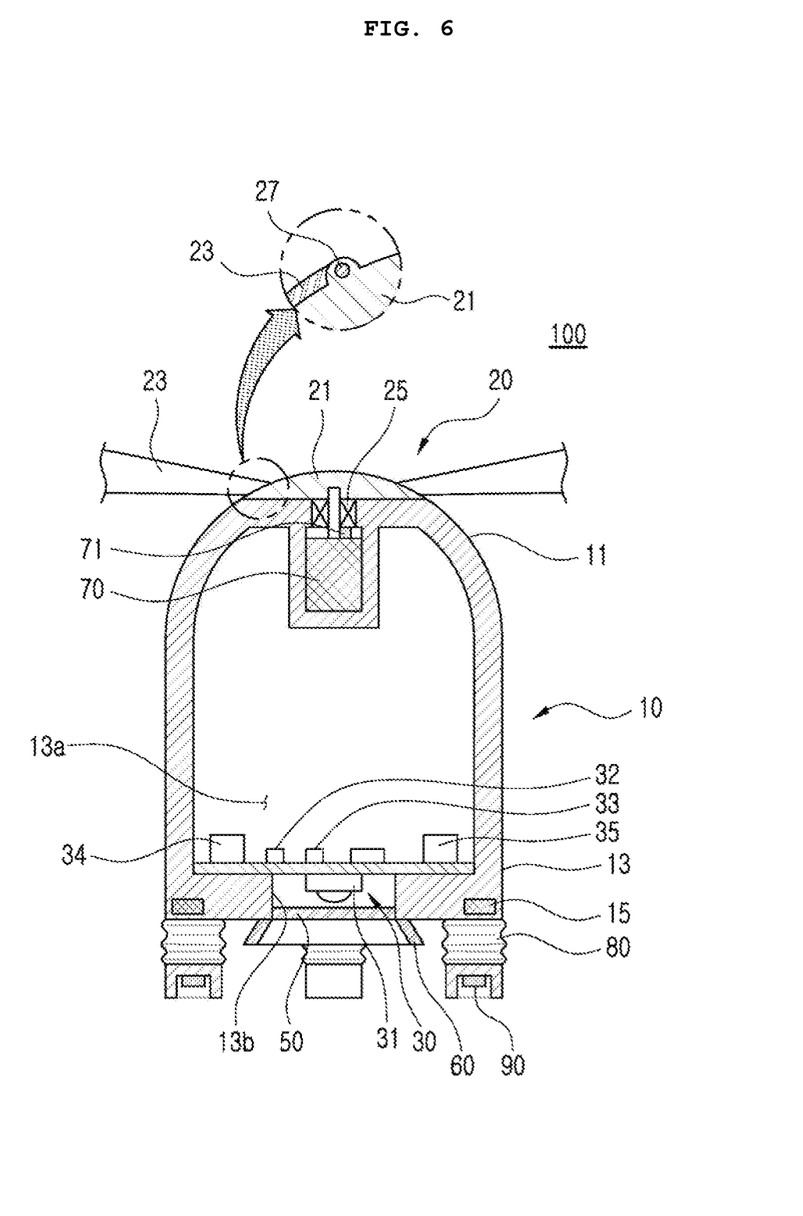
FIG. 6 is a view schematically illustrating a flying unit for observation according to another exemplary embodiment of the present disclosure.

FIG. 1 is a view schematically illustrating a process of operating a non-motorized flying unit for observation according to an exemplary embodiment of the present disclosure, FIG. 2 is a view illustrating part "A" in FIG. 1, and FIG. 3 is a view illustrating part "B" in FIG. 1. In addition, FIG. 4 is a cross-sectional view schematically illustrating the non-motorized flying unit for observation according to the exemplary embodiment of the present disclosure, FIG. 5 is a cross-sectional view schematically illustrating a process of launching the non-motorized flying unit for observation according to the exemplary embodiment of the present disclosure from a launcher, and FIG. 6 is a view schematically illustrating a flying unit for observation according to another exemplary embodiment of the present disclosure.

Referring to FIGS. 1 and 2, a non-motorized flying unit 100 for observation according to the exemplary embodiment of the present disclosure (hereinafter, referred to as the 'flying unit 100') is a flying device for observation which ascends to a high altitude in an emergency situation related to disaster or public safety in order to quickly ascertain a situation on the ground, and the non-motorized flying unit 100 includes a body part 10.

The body part 10 is mounted on a launcher 200, and when the launcher 200 operates, the body part 10 is separated from the launcher 200 by thrust (pressure) generated in the launcher 200, flies in a direction toward a preset target, and then freely falls toward the ground G from a position of a top dead point (TDP) by its own weight.

Figure 4:
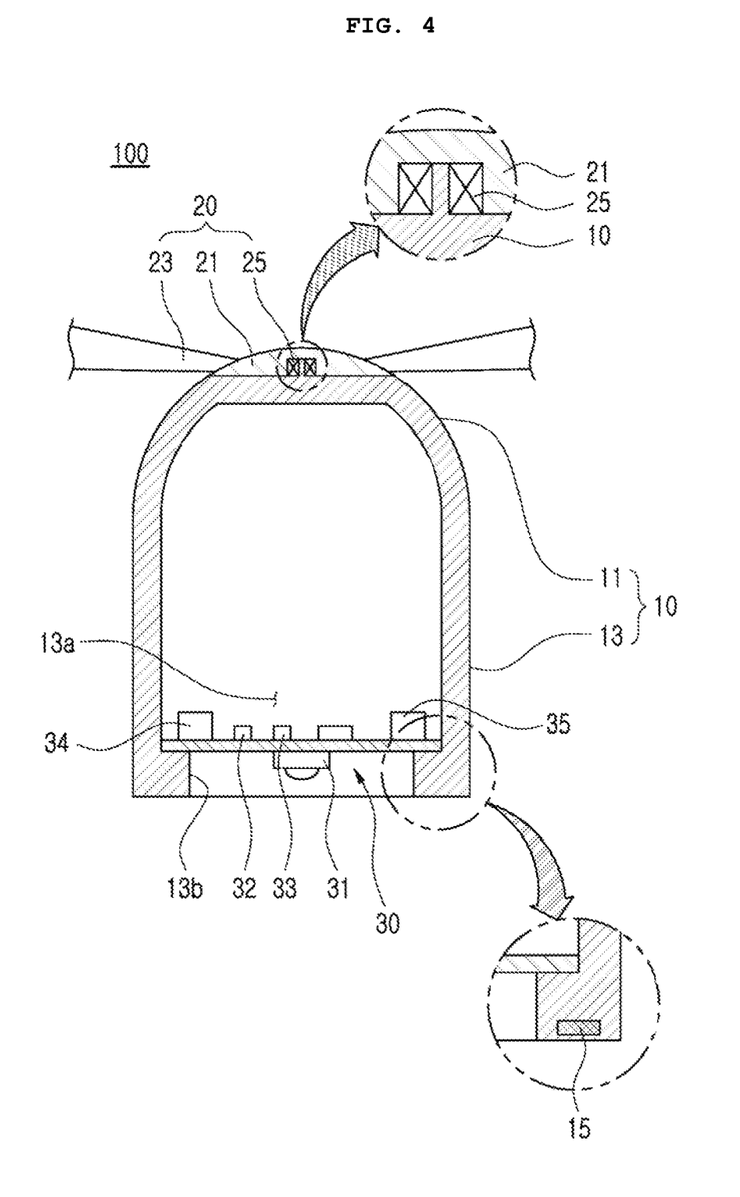
FIG. 4 is a cross-sectional view schematically illustrating the non-motorized flying unit for observation according to the exemplary embodiment of the present disclosure.

Referring to FIG. 4, the body part 10 may include a head part 11 and a tail part 13.

A propeller unit 20 to be described below is coupled to the head part 11, and the head part 11 is formed to have a streamlined structure, such that the head part 11 may be positioned toward the preset target when the body part 10 is mounted on the launcher 200.

An accommodation space 13a is formed in the tail part 13, an image capturing unit 30 to be described below is installed in the accommodation space 13a, and a through hole 13b, which allows the accommodation space 13a and an external space to communicate with each other, may be formed at an end portion of the tail part 13.

In addition, the tail part 13 may be formed to be relatively heavier than the head part 11. Therefore, the tail part 13 may be positioned toward the ground when the body part falls. That is, since the tail part 13 is formed to be relatively heavier than the head part 11, a center of gravity of the body part 10 is positioned at a lower side, that is, in the tail part 13, and for this reason, the tail part 13 is positioned toward the ground when the body part 10 falls. In this case, as illustrated in the enlarged part in FIG. 4, a weight 15, which may increase a weight of the end portion of the tail part 13, may be installed at the end portion of the tail part 13. Therefore, the through hole 13b formed at the end portion of the tail part 13 is disposed toward the ground when the body part 10 falls, such that the image capturing unit 30 installed in the tail part 13 may more accurately obtain image information in respect to the ground.

In addition, the flying unit 100 includes the propeller unit 20.

Referring to FIGS. 3 and 4, the propeller unit 20 is coupled to the body part 10, and automatically generates rotational force by means of drag force applied to the body part 10 when the body part 10 falls, thereby decreasing a falling velocity of the body part 10.

In more detail, the propeller unit 20 is rotatably coupled to the body part 10, and when the body part 10 falls, the propeller unit 20 is automatically spread outward from the body part 10 and then rotated by the drag force applied to the body part 10, thereby autonomously generating lift force without depending on a separate power-driven device. Therefore, it is possible to increase flying time of the falling body part 10.

The propeller unit 20 may include a rotating portion 21 and a plurality of blades 23.

The rotating portion 21 is rotatably coupled to the body part 10, and a bearing 25 may be provided in the rotating portion 21.

That is, the bearing 25, which is installed between the body part 10 and the rotating portion 21 and supports the propeller unit 20 so that the propeller unit 20 is rotatable, may be provided in the rotating portion 21 so that the rotational force is applied only to the propeller unit 20 in a state in which the body part 10 is fixed when the body part 10 falls. Therefore, the body part 10 is not rotated while the body part 10 falls even though the propeller unit 20 is rotated.

The plurality of blades 23 is installed at an equal interval around the rotating portion 21, the plurality of blades 23 comes into close contact with an outer surface of the body part 10 when the body part 10 ascends, and the plurality of blades 23 is spread outward from the body part 10 while being separated from the body part 10 by the drag force applied to the body part 10 when the body part 10 falls, such that the plurality of blades 23 may be rotated together with the rotating portion 21.

In this case, as illustrated in the enlarged part in FIG. 6, the blades 23 may be coupled to the rotating portion 21 through hinges 27, respectively. Therefore, the plurality of blades 23 may come into close contact with the outer surface of the body part 10 in a state in which the plurality of blades 23 is folded when the body part 10 ascends, and the plurality of blades 23 may be spread outward from the body part 10 at a preset angle about the hinges 27 when the body part 10 descends. In addition, the plurality of blades 23 is made of a material having flexibility, such that the plurality of blades 23 may completely surround the outer surface of the body part 10 when the plurality of blades 23 is in close contact with the outer surface of the body part 10.

In addition, the flying unit 100 includes the image capturing unit 30.

Referring to FIG. 4, the image capturing unit 30 is installed in the body part 10 and obtains image information in respect to the ground when the body part 10 falls.

In more detail, the image capturing unit 30 may include a camera unit 31 which obtains image information, a communication unit 32 which transmits the image information obtained by the camera unit 31 to the outside, a GPS receiving unit 33 which transmits information about a current position of the body part 10 to the outside, a power source unit 34 which supplies electric power to the camera unit 31, the communication unit 32, and the GPS receiving unit 33, and a control unit 35 which controls the camera unit 31, the communication unit 32, the GPS receiving unit 33, and the power source unit 34.

Here, the image information obtained by the camera unit 31 includes photographs and moving pictures including audio signals, and the information about the current position of the body part 10, which is generated by the GPS receiving unit 33, may include information about planar positions on the map and information about an altitude. Further, a wireless communication method is applied to the communication unit 32, such that the communication unit 32 may transmit the image information obtained by the camera unit 31 to an external device, for example, a personal computer (PC) or a portable terminal, in real time or at a preset time interval.

In addition, the flying unit 100 may further include a propulsion unit 40.

Referring to FIG. 5, the propulsion unit 40 is coupled to the tail part 13 of the body part 10 and stores therein a propellant 41, such that the propellant 41 is combusted when the launcher 200 operates and pressure is formed in the propulsion unit 40, thereby providing thrust to the body part 10. Therefore, a flying distance of the body part 10 may be increased.

Meanwhile, the flying unit 100 may further include a protective window 50 and a hood 60.

Referring to FIG. 6, the protective window 50 may be installed in the through hole 13b formed in the tail part 13.

That is, the protective window 50 may be further installed in the through hole 13b formed in the tail part 13 in order to prevent pressure, which is applied to the end portion of the tail part 13 when the launcher 200 operates, from being transmitted directly to the image capturing unit 30 through the through hole 13b. Therefore, it is possible to not only prevent the image capturing unit 30 from being damaged by the pressure generated by the launcher 200, but also prevent foreign substances from entering the accommodation space 13a of the tail part 13.

In addition, the hood 60, which protrudes to a preset length in a longitudinal direction from the end portion of the tail part 13 so as to surround the through hole 13b, may be installed at the end portion of the tail part 13.

Therefore, it is possible to prevent deterioration in image quality by preventing light from entering the camera unit 31 of the image capturing unit 30 which is disposed in the tail part 13 so as to face the protective window 50.

In addition, the flying unit 100 may further include an emergency power generating device 70.

Referring to FIG. 6, the emergency power generating device 70, which is coupled to the propeller unit 20 and rotates the propeller unit 20 based on a preset condition, may be provided in the head part 11. That is, in a situation in which the propeller unit 20 does not operate at a point in time at which the flying unit 100 is launched from the launcher 200, reaches the top dead point, and then begins to fall or in a situation in which a rotational speed of the propeller unit 20 is higher or lower than a reference speed, the emergency power generating device 70 serves to rotate the propeller unit 20 at a preset speed and in a preset direction in order to cope with the aforementioned situation. In this case, a rotation detecting sensor 71, which detects a rotation amount of the propeller unit 20, may be installed at a position of the body part 10 to which the propeller unit 20 is coupled. In addition, the emergency power generating device 70 is supplied with power through the power source unit 34 provided in the image capturing unit 30, and the emergency power generating device 70 may be controlled by the control unit 35. That is, in a case in which the propeller unit 20 does not operate normally due to an unexpected situation when the flying unit 100 falls, the rotation detecting sensor 71 detects the abnormal operation of the propeller unit 20 and transmits a signal to the control unit 35, and the control unit 35 determines the abnormality of the propeller unit 20 based on a preset determination condition depending on the signal from the rotation detecting sensor 71, and transmits a command for allowing the emergency power generating device 70 to rotate the propeller unit 20, and as a result, it is possible to operate the propeller unit 20 even in a situation in which drag force is not sufficiently delivered to the body part 10 or the propeller unit 20 cannot be operated due to an environmental factor.

In addition, the flying unit 100 may further include a shock absorbing device 80.

Referring to FIG. 6, a plurality of shock absorbing devices 80 may be installed at the end portion of the tail part 13.

The shock absorbing device 80 may be formed to have a structure that is deformed in shape in a direction in which impact is applied so as to disperse the impact so as to minimize the impact applied to the body part 10 when the flying unit 100 falls to the ground and collides with the ground surface. Therefore, it is possible to prevent damage to the image capturing unit 30 installed in the body part 10.

In addition, the flying unit 100 may further include a lighting device 90.

Referring to FIG. 6, the lighting devices 90, which may emit light in a direction in which the body part 10 falls when the body part 10 falls, may be installed at end portions of the plurality of shock absorbing devices 80, respectively.

In a case in which it is difficult for the camera unit to capture images because a periphery is dark due to an environmental factor, the lighting devices 90 emit light in the direction in which the camera unit 31 captures images and thus serves as a flashlight, thereby enabling the camera unit 31 to capture images, and the lighting devices 90 are turned on in various manners, thereby serving to transmit signals in an emergency situation.

According to the present disclosure, like a bullet, a small-sized rocket, or the like, the non-motorized flying unit for observation is mounted on the launcher 200 and then launched to a high altitude in an emergency situation related to disaster, public safety, and the like, and the non-motorized flying unit may obtain image information in respect to the situation on the ground while automatically generating rotational force by using drag force and slowly falling to the ground surface, such that the non-motorized flying unit is simply used and separate manipulation is not required to fly the non-motorized flying unit, and as a result, it is possible to quickly observe a periphery of a location where the emergency situation occurs without requiring time for preparing the operation of the non-motorized flying unit.

In addition, the non-motorized flying unit for observation has a simple structure and requires no separate power-driven device, and as a result, the non-motorized flying unit may be maintained/managed at a low cost in comparison with a manned/unmanned aerial vehicle, and a probability of exposing the position of the non-motorized flying unit is minimized even when performing a task that requires security, and as a result, it is possible to safely perform the task.

While the present disclosure has been described in connection with the exemplary embodiments, the scope of the present disclosure is not limited to the disclosed embodiments, but, on the contrary, is intended to cover various modifications and equivalent arrangements included within the spirit and scope of the appended claims.

What is claimed is:

1. A non-motorized flying unit for observation comprising:
    a body part having a head part which is formed to have a streamlined structure and a tail part which has therein an accommodation space and a through hole that is formed at an end portion of the tail part and communicates with the accommodation space, wherein the tail part is heavier than the head part so that the tail part is directed toward a ground upon falling of the body part;
    a propeller unit which is coupled to the head part configured to decrease a falling velocity of the body part;
    an image capturing unit which is installed in the through hole of the tail part configured to obtain an image information in respect to the ground upon falling of the body part;
    a protective window installed in the through hole formed in the tail part;
    a plurality of shock absorbing devices installed at the end portion of the tail part, wherein the plurality of shock absorbing devices are capable of being deformed in shape in a direction in which impact is applied so as to disperse the impact applied to the body part;
    a weight installed at the end portion of the tail part;
    a lighting device installed at an end portion of the plurality of shock absorbing devices; and
    a propulsion unit which is detachably coupled to the tail part of the body part, the propulsion unit storing a propellant which, upon combustion, forms pressure in the propulsion unit to provide thrust to the body part.

2. The non-motorized flying unit according to claim 1, wherein the propeller unit includes:
    a rotating portion which is rotatably coupled to the body part; and
    a plurality of blades which is installed at an equal interval around the rotating portion, comes into contact with an outer surface of the body part when the body part ascends, and is spread outward from the body part by drag force applied to the body part when the body part falls, such that the plurality of blades is rotated together with the rotating portion.

3. The non-motorized flying unit according to claim 2, wherein a bearing, which is installed between the body part and the rotating portion and supports the propeller unit so that the propeller unit is rotatable, is provided in the rotating portion so that rotational force is applied only to the propeller unit in a state in which the body part is fixed when the body part falls.

4. The non-motorized flying unit according to claim 1, wherein the image capturing unit includes:
    a camera unit which obtains the image information;
    a communication unit which transmits the image information obtained by the camera unit to the outside;
    a GPS receiving unit which transmits information about a current position of the body part to the outside;
    a power source unit which supplies electric power to the camera unit, the communication unit, and the GPS receiving unit; and
    a control unit which controls the camera unit, the communication unit, the GPS receiving unit, and the power source unit.

* * * * *